United States Patent
Gaynes et al.

(10) Patent No.: US 6,487,461 B1
(45) Date of Patent: Nov. 26, 2002

(54) TFT PANEL ALIGNMENT AND ATTACHMENT METHOD AND APPARATUS

(75) Inventors: Michael A. Gaynes, Vestal; Allan O. Johnson, Johnson City; Ramesh R. Kodnani; Mark V. Pierson, both of Binghamton; Edward J. Tasillo, Newark Valley, all of NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 09/590,280

(22) Filed: Jun. 9, 2000

Related U.S. Application Data

(63) Continuation of application No. 09/082,287, filed on May 19, 1998, now Pat. No. 6,193,576.

(51) Int. Cl.[7] ............................................. G05B 19/18
(52) U.S. Cl. ............................. 700/58; 700/57; 700/56; 700/54; 700/62; 700/64; 349/73; 349/153; 349/190; 349/187; 345/88; 345/589; 345/903; 156/104; 156/106; 156/87; 156/286; 455/24; 455/60
(58) Field of Search .............................. 700/56, 57, 58, 700/59, 60, 61, 62, 64; 445/24, 60; 349/187, 73–75, 153, 158, 156, 149, 190, 78; 345/88, 903, 1.3, 589; 156/104, 106, 286, 87, 300

(56) References Cited

U.S. PATENT DOCUMENTS

| | | | | |
|---|---|---|---|---|
| 5,781,258 A | * | 7/1998 | Dabral et al. | 349/153 |
| 5,805,117 A | * | 9/1998 | Mazurek et al. | 248/919 |
| 5,867,236 A | * | 2/1999 | Babuka et al. | 349/153 |
| 5,889,568 A | * | 3/1999 | Seraphim et al. | 349/1 |
| 5,903,328 A | * | 5/1999 | Greene et al. | 156/304.1 |
| 5,910,830 A | * | 6/1999 | Nam | 257/59 |
| 5,963,281 A | * | 10/1999 | Koons et al. | 349/153 |
| 6,129,804 A | * | 10/2000 | Gaynes et al. | 156/295 |
| 6,193,576 B1 | * | 2/2001 | Gaynes et al. | 349/187 |
| 6,344,099 B1 | * | 2/2002 | Gaynes et al. | 156/275.5 |
| 6,381,072 B1 | * | 4/2002 | Burger | 359/621 |

* cited by examiner

*Primary Examiner*—Ramesh Patel
(74) *Attorney, Agent, or Firm*—Connolly Bove Lodge & Hutz; David L. Adour

(57) ABSTRACT

A method for aligning a plurality of thin film transistor tiles for constructing a flat panel display. A coverplate is arranged on a coverplate support. A first layer of a bonding material is applied to at least one of a first side of each of the tiles and a surface of the coverplate on which the tiles are to be secured. The tiles are arranged on the coverplate, such that the first layer of bonding material is arranged between the tiles and the coverplate. The tiles are connected to an alignment apparatus. The tiles are aligned relative to each other and the coverplate. The tiles are at least partially secured to the coverplate.

4 Claims, 2 Drawing Sheets

TFT PANEL ALIGNMENT AND ATTACHMENT METHOD AND APPARATUS

This application is a continuation of application Ser. No. 09/082,287, now U.S. Pat. No. 6,193,576 B1, filed May 19, 1998.

FIELD OF THE INVENTION

The invention relates to a method and apparatus for forming a flat panel display by combining a plurality of individual display devices.

BACKGROUND OF THE INVENTION

The size of an individual display device such as a liquid crystal display (LCD) element typically is limited by acceptable manufacturing yields using currently known techniques and tools. It is therefore advantageous to be able to combine several display devices together to produce either a larger display or to mount individual display devices in various positions on a larger display panel. For example, in the computer, television, and entertainment industries, large area displays of a size much larger than single display device sizes are desired for viewing by groups of people or single individuals. In such applications, close placement-and alignment of display devices to each other are critical parameters in order to make the edges of the display devices inconspicuous, that is, to ensure no breaks are visible as information is viewed across the boundaries from display device to display device. Automotive and aircraft dashboard panels may require information such as speed, temperature, and fuel level to be displayed in various positions, sometimes with large gaps between these positions, on a large overall display panel.

One method of forming a display panel is to clamp individual display elements between two glass plates using screws or other tighteners and brackets of various design about the edges of the glass plates. Individual display elements may then be viewed through one of the glass plates. The display can be illuminated, if necessary, by placing a light source behind the second glass plate. Such a method is set forth, for example, in U.S. Pat. No. 4,156,833, the entire disclosure of which is hereby incorporated by reference.

Both the illuminating radiation (hereinafter referred to as "light") as well as the display device image must, of necessity, pass through one or more of the glass plates. Optical properties of the glass plates (such as the transmission/absorption spectrum, and reflectance properties both surfaces) are important design parameters that can affect display panel performance. These parameters can possibly cause reductions in brightness, contrast, and resolution. Consequently, it is important to select a glass material and surface treatment with care and to minimize the number of layers and interference surfaces through which the images and illuminating light must pass. Obvious variations of this overall structure are possible using optically transparent materials other than glass, such as various plastics, or even opaque materials, for the backplate in applications where reverse illumination is not needed.

Placing and holding individual display devices in accurate alignment prior to clamping the glass plates together has been difficult to achieve due to extremely precise requirements on alignment accuracy and the possibility of shifting one or more devices previously aligned as others are added prior to clamping all of these in place.

It is also beneficial to provide a seal to prevent dust, moisture, and/or other contaminants, from entering the display panel after assembly. Including a seal during clamping can add complexity and difficulty to the clamping process. methods which are the subject of other patents have been developed for making electrical connection to each of the display elements, or for providing electrical interconnection between these. Connections can be made by overlapping edges of display elements as shown in U.S. Pat. Nos. 5,164,853 and 4,408,836 and Japanese patent JA 0302222, or by abutting corresponding conductive pads on edge surfaces of adjacent display elements as shown in U.S. Pat. No. 5,067,021. The entire contents of the four patents immediately above are hereby incorporated herein by reference. Any of the above or other connection schemes can be employed in the present invention.

SUMMARY OF THE PRESENT INVENTION

It is an object of the present invention to provide a device for aligning and attaching a plurality of display devices to provide a larger display.

Another object of the present invention is to provide a method for aligning and attaching a plurality of display devices utilizing the apparatus.

In accordance with these and other objects and advantages, the present invention provides a method for aligning a plurality of thin film transistor display devices or tiles for constructing a flat panel display. A coverplate is arranged on a coverplate support. A first layer of a bonding material is applied to at least one of a first side of each of the tiles and a surface of the coverplate on which the tiles are to be secured. The tiles are arranged on the coverplate such that the first layer of bonding material is arranged between the tiles and the coverplate. The tiles are connected to an alignment apparatus. The tiles are aligned relative to each other and/or relative to the coverplate. The tiles are then at least partially secured to the coverplate. A second layer of a bonding material is applied to at least one of a second side of each of the tiles and a surface of a backplate to be secured to the tiles. The backplate is arranged on the tiles, such that the second layer of bonding material is arranged between the backplate and the tiles. The backplate is aligned relative to the tiles. The backplate is at least partially secured to the tiles. Then, the first layer of bonding material and the second layer of bonding material are fully cured, thereby attaching the tiles to the coverplate, the backplate to the tiles, and the tiles to each other.

Additional aspects of the present invention provide an apparatus for aligning and attaching together a plurality of thin film transistor tiles for constructing a flat panel display. The apparatus includes a coverplate support for supporting a coverplate that the tiles are to be attached to. The apparatus also includes a tile engager, a tile position alterer and a detector for detecting the position of the tiles relative to each other and relative to the coverplate. The apparatus further includes apparatus for at least partially securing the tiles to the coverplate. The apparatus further includes apparatus for at least partially securing the tiles to the coverplate. The apparatus further includes a backplate engager for engaging a backplate arranged on the tiles, a backplate position alterer for altering a position of the backplate, and apparatus for at least partially securing the backplate to the tiles.

Still other objects and advantages of the present invention will become readily apparent by those skilled in the art from the following detailed description, wherein it is shown and described only the preferred embodiments of the invention, simply by way of illustration of the best mode. contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF THE INVENTION

Figure 1:
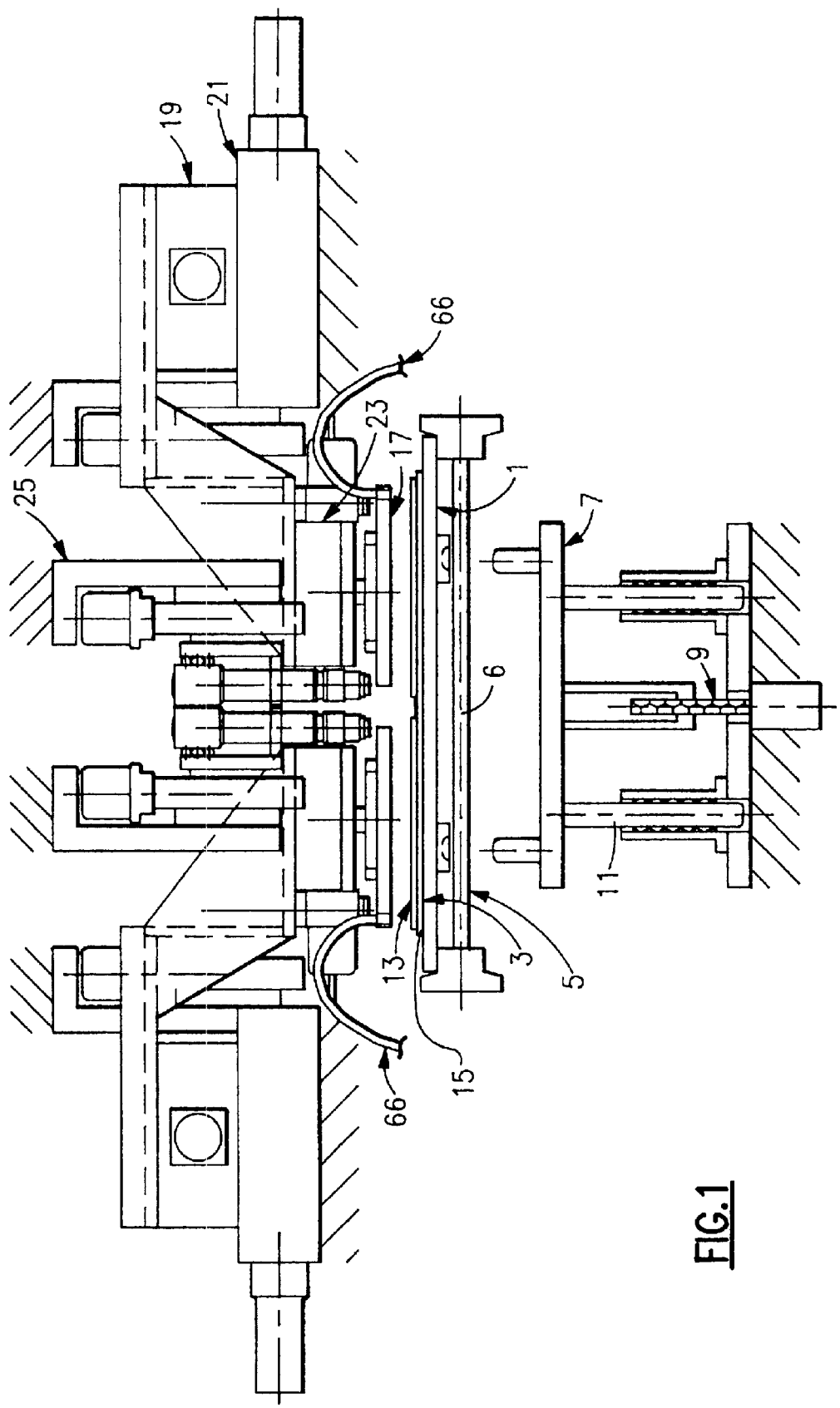
FIG. 1 represents a side view of the embodiment of and apparatus according to the present invention.

FIG. 1 illustrates a side view of an embodiment of an apparatus according to the present invention. The embodiment shown in FIG. 1 includes a coverplate assembly fixture 1. The assembly fixture acts as a support for a coverplate 3, which is arranged on the assembly fixture 1.

As the flat panel display device is constructed, the assembly fixture 1 will act as a support for the entire device including the individual display tiles and the backplate. The assembly fixture 1 and any elements of the display arranged on the assembly fixture may be transported by an assembly fixture conveyor 5. The assembly fixture conveyor may be utilized to alter the position of the assembly fixture and the elements of the display arranged on the assembly fixture.

The present invention may include an assembly fixture elevator 7. The assembly fixture elevator 7 may be utilized to alter a vertical position of the assembly fixture 1 and any elements of the display arranged on the assembly fixture. Any type of apparatus for altering the vertical position of an element such as the assembly fixture 1 may be utilized in the assembly fixture elevator according to the present invention. Those skilled in the art would be able to determine such a device easily. Accordingly, a detailed description of such device is not included herein.

The assembly fixture 1 may include means for retaining on the assembly fixture the coverplate and any elements arranged on the coverplate. For example, the assembly fixture may include clamps that retain the coverplate on the assembly fixture. According to another embodiment, the assembly fixture includes a vacuum source for retaining the coverplate on the assembly fixture.

The assembly fixture 1 may also include means for retaining the tiles or backplate. For example, the assembly fixture may include swinging vacuum clamps for retaining the tiles and/or the backplate on the assembly fixture. Such clamps may be especially useful for retaining the tiles and/or backplate during the time between their rough placement and arrangement on the coverplate, in the case of the tiles, or on the tiles, in the case of the backplate, and the time at which the tiles and/or backplate are aligned and attached.

In addition to the above, according to some embodiments, the means for retaining the coverplate, tiles, and/or backplate on the assembly fixture 1, may only immobilize the coverplate, tiles, and/or backplate in the x and y directions.

The elevator 7 may be utilized to bring the coverplate, tiles, and/or backplate into a position where tile engaging, supporting, and aligning means may engage the tiles. According to one embodiment, the elevator includes a motor driven ballscrew to actuate a set of lift posts that protrude up through the assembly fixture conveyor to access the bottom of the assembly fixture.

The assembly fixture conveyor may include a variety of means for transporting the assembly fixture. For example, the assembly fixture conveyor may include a plurality of rollers. The assembly fixture conveyor could also include a belt. The conveyor and/or the assembly fixture could be powered to result in movement of the assembly fixture.

Tiles 13, each of which represents an individual flat panel LCD display, are placed upon the coverplate 3 at the beginning of the process of the present invention for forming a larger flat panel display. Bonding material may be applied to the top surface of the coverplate in the orientation illustrated in FIG. 1 and/or the bottom surface of the tiles in the configuration illustrated in FIG. 1. Accordingly, the apparatus according to the present invention may include means for applying bonding material, such as an adhesive, to either the coverplate and/or the tiles for forming a bond between the coverplate and tiles.

Any type of apparatus may be utilized for dispensing the bonding material. For example, an x-y bonding material dispenser could be utilized. Such a dispenser typically includes two arms that interact with each other. For example, one arm may ride along the other arm.

The bonding material dispenser typically includes a dispensing nozzle that may ride along one of the arms. Accordingly, the bonding material dispenser may dispense bonding material at any point on the surface of the coverplate by altering the position of at least one of the arms and nozzle.

The adhesive may be applied and according to any known pattern. For example, the bonding material could be substantially uniformly deposited on the entire surface of the coverplate. According to one pattern, the bonding material is applied to the surface of the coverplate in a star or asterisk pattern.

The star pattern may be generated on the coverplate by controlling the path of the nozzle and the nozzle's on/off control. The star pattern may be created by depositing bonding material from the nozzle while simultaneously moving the nozzle in repeated straight lines, including horizonal, vertical, and angled 45 degrees from the horizontal and vertical lines. Such lines of bonding material may be formed such that the lines intersect at a point where the center of a tile will be arranged.

The nozzle during such an operation will be on during the movement along the lines described above. Otherwise, the nozzle will be off such that bonding material will not flow from the nozzle. The volume of bonding material that will be dispensed from the nozzle may be a function of flow rate of bonding material from the nozzle. The volume of bonding material that will be dispensed from the nozzle may also be a function of the velocity of the nozzle as it deposits the lines of bonding material. These parameters may be easily determined through routine experimentation. Typically, the deposition of the bonding material is carried out so as to ensure that the entire mating surfaces of the tile and the coverplate are covered with adhesive.

A bonding material may also be applied to the surface of the tiles 13 shown in FIG. 1 on the side opposite the coverplate to facilitate the retaining of the tiles by means for engaging, supporting, and altering a position of the tiles. Therefore, the present invention may include means for applying a bonding material to this side of the tiles for this purpose. Preferably, such means applies a small amount, or dot, of a bonding material in the vicinity of the center of each of the tiles.

FIG. 1 illustrates the bonding material 15 between the coverplate and the tiles.

Examples of bonding materials that may be utilized to secure the tiles to the coverplate include adhesives. Examples of suitable adhesives include LUXTRAK 4031, LUXTRAK 4170 and LUXTRAC 4116, all available from Ablestik Labs, or VLC701, available from Glotrax Incorporated. Preferably, the bonding material is optically clear when cured.

As stated above, the present invention includes means for engaging, retaining, and altering position of each of the tiles. These three functions may be carried out by three or more separate means. Alternatively, the means may be combined into one device, such as by being connected together.

The embodiment illustrated in FIG. 1 includes a tile chuck 17. The tile chuck preferably includes means for engaging and retaining the tiles. According to one embodiment, the tile chuck includes a vacuum source to hold the tile. However, the present invention may include other apparatus for holding the tiles. For example, the apparatus could include clamps.

Preferably, the tile chuck is compliant in movements that are not parallel to the upper surface of the tiles and coverplates. In other words, preferably, the tile chuck is compliant in pitch, roll, and the z axis direction. However, the chuck may be under motor control and non-compliant in directions parallel to the upper surface of the tiles and/or the coverplate. In other words, the chuck preferably under motor control in the x and y and directions and rotationally in the x-y plane.

By permitting the chuck to be compliant in the pitch, roll and z axis directions, the thickness of the tiles and thickness of the bonding material may be absorbed in these compliant directions. As such, the tile engaging, retaining and alignment means may not apply significant force or any force to the tiles in the compliant directions. On the hand, as stated above, the position of the tile chuck may be altered in the x and y directions as well as rotationally in the x-y plane.

According to one embodiment, the tile chuck may be moved up to four inches both in the x and y directions.

Clamps on the assembly fixture, such as the swinging vacuum clamps discussed above, may prevent the tiles from moving when unengaged by the tile chuck and when not secured to the coverplate, even at least partially.

To help ensure alignment of the tiles with respect to each other and with respect to the coverplate, the position of the tile chuck may be altered in the x-y plane. Accordingly, the present invention may include a plurality of means for altering the position of each tile chuck. For example, each tile chuck may be controlled by a motor for altering the position of the tile chuck in the x direction 19 and a motor for altering the position of the tile chuck in the y direction 21. The tile chucks may also be controlled by a third motor 23 for rotationally altering the position of each tile chuck in the x-y plane.

Any motor known to those skilled in the art could be utilized to alter the position of the tile via the tile chucks. According to one example, piezoelectric motors may be utilized according to the present invention.

To facilitate the detection of the position of the tiles relative to each other and relative to the coverplate, the tiles and coverplate may be provided with fiducial marks. At least one fiducial mark may be included on each tile as well as on the coverplate. According to one embodiment, each tile may include two fiducial marks. According to one embodiment, the fiducial marks are small round dots.

According to one embodiment, the fiducial marks on the coverplate are small round dots while the fiducial marks on the tiles are small rings. This embodiment typically includes at least one dot on each tile or on the coverplate in each area covered by a tile and a circle on the each tile or the coverplate in a corresponding location. According to such an embodiment, the rings may have an internal diameter slightly larger than the outer diameter of the dots. The tiles are positioned relative to the coverplate by positioning the dots within the rings.

The alignment of the tiles relative to each other and relative to the coverplate may be determined by cameras. Accordingly, the present invention may include at least one camera 25 for determining a position of the fiducial marks on the tiles relative to each other and/or relative to fiducial marks on the coverplate. According to one embodiment, the present invention includes at least one camera arranged in association with each tile.

Figure 2:
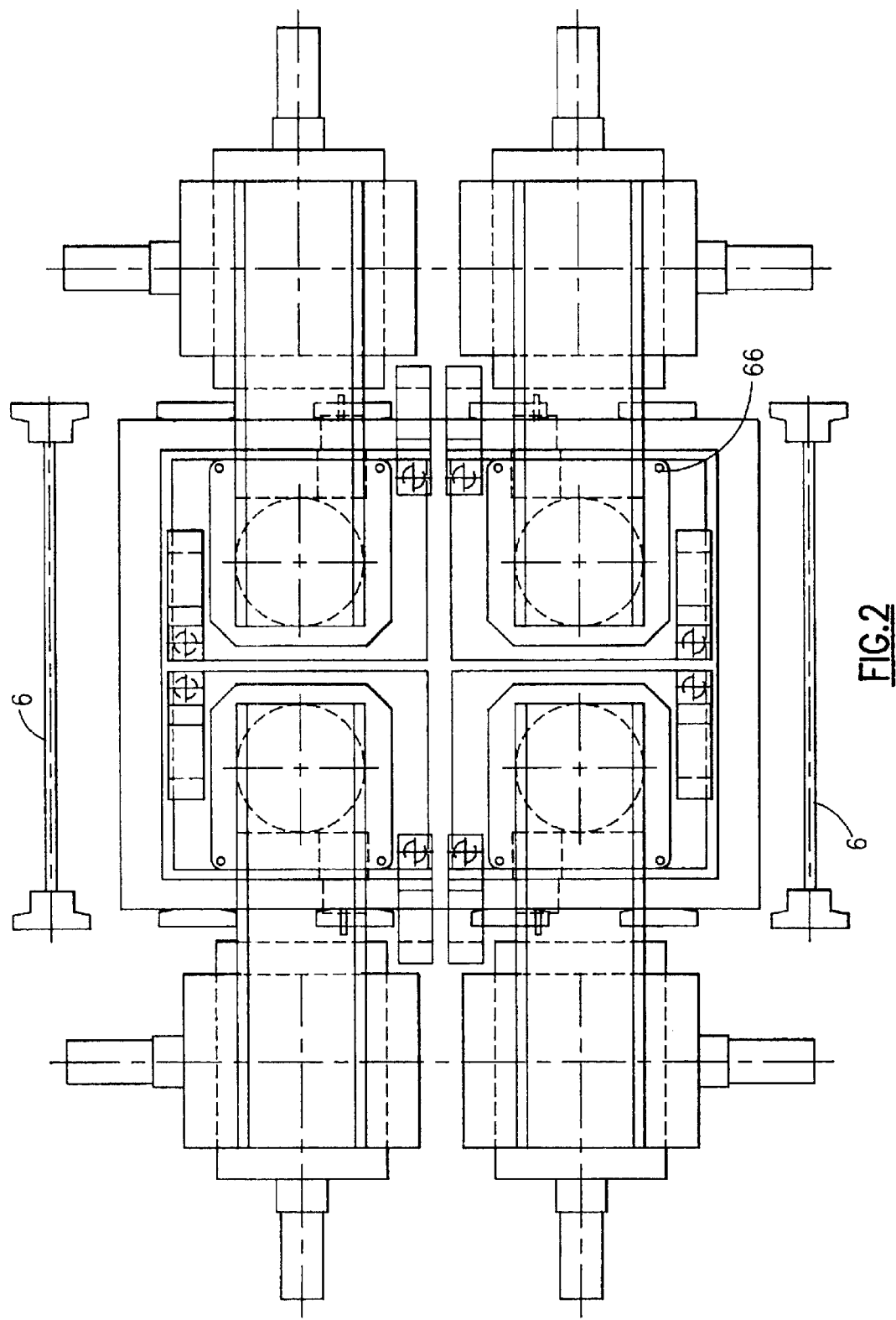
FIG. 2 represents a top view of an apparatus according to the present invention.

The embodiment shown in FIGS. 1 and 2 includes two cameras associated with each tile and tile chuck. The camera(s) may be mounted on the chuck assembly as in the embodiment shown in FIGS. 1 and 2. The cameras may be focusable on the fiducial marks on the coverplate and the tiles.

According to one embodiment, the cameras are moved up and down. According to another embodiment, the cameras include focusing objects to accomplish this task. A variety of cameras may be utilized according to the present invention. For example, one embodiment of the present invention includes CCD cameras. The position of the cameras relative to the tiles may be altered, depending upon the size of the tiles and ultimate size of the display being formed with the apparatus.

The present invention may include a computerized control for controlling movement of the chucks and, hence, the tiles. The computerized control may also control focusing of the camera(s). Along these lines, once !the relative positions of the fiducial marks on the tiles and/or the coverplate are determined, the control system may determine the correct amount of movement in the x, y and theta directions for each tile necessary to cause the tiles to move to the proper location.

The tiles may be moved one at a time. Alternatively, two or more tiles may be moved simultaneously. After the tiles are moved, the alignment of the tiles and/or coverplate. may again be checked utilizing the camera(s). If necessary, one or more of the tiles may again be moved to ensure that they are aligned within a desired tolerance. The alignment verification and processes may be carried out as many times as necessary to ensure alignment of the tiles and coverplate.

According to the embodiment that includes the dot and circle fiducial marks, the tiles are arranged such that the fiducial marks on the coverplate and the tiles are aligned so as to be coaxial within a tolerance of ±0.0005 inch, or whatever tolerance is dictated by the geometry of the pixels and/or grid pattern.

To facilitate alignment of the tiles and coverplate, at least one light source may be arranged on an opposite side of the tiles and coverplate from the camera(s). By arranging a light source in such a manner, a light source. may provide back illumination to yield a high contrast image of the fiducial marks on the coverplate and tiles. The apparatus of the present invention may include a plurality of light sources to illuminate various portions of the tiles and coverplate.

Once the tiles are properly aligned relative to each other and relative to the coverplate, the tiles may be at least partially secured to the coverplate. The at least partial securing may be accomplished by at least partially curing at least a portion of the bonding material between the tiles and the coverplate. How the at least partial curing is carried out may depend upon the type of bonding material being utilized. For example, the bonding material may be curable with ultraviolet light. According to such an embodiment, the apparatus according to the present invention may include at least one source of ultraviolet radiation for curing the bonding material. To accomplish the at least partial securing of the tiles to the coverplate, the bonding material may be spot cured in at least one location between each tile and the coverplate.

As illustrated in FIGS. 1 and 2, the present invention may include at least one source of ultraviolet radiation 66, including a light guide.

According to one embodiment, the present invention includes a plurality of UV light sources/guides 66 mounted outside the perimeter of the tiles to conduct ultraviolet radiation onto spots that will fall outside of the viewing area of the display panel when the display panel is completed. Although the bonding material may be fully cured at a later time, it may still necessary to spot cure the bonding material so as to help stabilize or immobilize the tiles relative to the coverplate. Preferably, if partial spot curing is utilized to partially secure the tiles to the coverplate, the spot curing is carried out outside of the functional area of the display panel since a halo of partially cured bonded material may result around the area of spot curing. Such halo areas would be objectionable if they fell within the viewing area of the finished display. However, if means and/or bonding material (s) are known or developed that would not produce such a halo, the spot curing may take place anywhere on the tiles.

Additionally, the bonding material may be curable in another manner. For example, the bonding material may be heat curable. Accordingly, the invention may include means for applying heat to spot cure the bonded material. The at least partial curing of a heat-curable bonding material may take place outside of the viewable area of the display as well.

The present invention may also include any other means for at least partially curing the bonding material.

After the tiles are at least partially secured to the coverplate, a backplate may be secured to the tiles. The backplate may be arranged on and secured to the tiles with a separate apparatus. The apparatus shown in FIGS. 1 and 2 may also be utilized.

Prior to attaching the backplate, a bonding material is applied to the surface of the tiles opposite the coverplate and/or the surface of the backplate that is to be secured to the tiles. Accordingly, an apparatus according to the invention may include means for applying a bonding material to the tiles and/or the backplate. The apparatus for applying bonding material to the tiles and/or backplate may be the same apparatus that is used for applying bonding material to the tiles and/or coverplate.

After application of the bonding material, the backplate may then be arranged on the tiles just as the tiles were arranged on the coverplate.

The backplate may then be engaged by means for engaging, supporting and altering the position of the backplate. The means for engaging supporting and altering the position of the backplate may be substantially similar to the apparatus as described above for engaging, supporting and altering the position of tiles. In fact, the same apparatus may be utilized. Alternatively, a single apparatus such as that described above for engaging, supporting and altering a position of a single tile may be utilized with the backplate.

Additionally, the operation of the means for engaging, supporting and altering the position of the backplate may be substantially the same as the means for engaging, supporting and altering the position of the tiles. In view of the similarity of the apparatus and operation of the apparatus for engaging, supporting and altering the position of the backplate, to the same apparatus for performing the same function to the tiles, the apparatus and method need not be discussed in further detail here.

Once the backplate is properly positioned on the tiles, the backplate may be at least partially secured to the tiles. Just as the tiles were at least partially secured to the coverplate, the backplate may similarly be at least partially secured to the tiles. Just as with the tiles, the at least partial securing may be carried out by at least partially curing at least a portion of the bonding material between the backplate and the tiles. Similar to the at least partial curing of the bonding material between the tiles and the coverplate, if the backplate is secured to the tiles by at least partially securing the bonding material, preferably, the at least partial curing takes place on an area that will fall outside the viewable area of the display when the display is completed. Once again, reference is made to the discussion above regarding the at least partial securing of the tiles to the coverplate regarding the at least partial securing of the backplate to the tiles.

Once the backplate is at least partially secured to the tiles, the bonding material between the coverplate and the tiles and the bonding material between tiles and the backplate may be fully cured. Preferably, the bonding material in both locations is optically transparent when cured.

After full curing of the bonding material, further operations may be carried out on the completed display. The apparatus of the present invention may be included in a system for forming a flat panel display from a plurality of smaller flat panel displays. Such a system is disclosed in U.S. patent application to the same inventors with the same title as this application and having the reference EN 9-97-133 appearing in the lower left corner of the pages of the application. The entire contents of the disclosure of this application is hereby incorporated by reference.

The present invention also includes a method for aligning a plurality of thin film transistor display panels or tiles and attaching them to a coverplate for constructing a flat panel display. The method of the present invention may be utilized to form relatively large flat panel displays from a plurality of smaller panels or tiles. For example, the present invention may be utilized to form finished flat panel displays having diagonal dimensions of from 32–45 inches. However, the present invention may be utilized to form any size display.

The present invention utilizes smaller readily available panels or tiles and aligns or assembles them to produce a seamless display panel of much larger size. A grid mask preferably is included in a coverplate glass that the tiles are attached to. The front mask of grid lines effectively hides the seams between the tiles or subpanels. The front mask/grid blocks light from passing through the grid lines, thereby obscuring the seams between the tiles. According to some embodiments, the front mask/grid may be metallic or polymeric. A bonding material, such as an adhesive is utilized to join the tiles to the coverplate and the backplate to the tiles. The bonding material should be optically transparent or clear when cured.

According to the method, a coverplate is arranged on an assembly fixture. A bonding material is applied to a surface of the coverplate that the tiles are to be secured to and/or the surface of the tiles that are to be secured to the coverplate.

The tiles may then be roughly arranged on the coverplate. According to one embodiment, the coverplate is raised up to the tiles using an elevator.

At this point, with the tiles roughly arranged on the coverplate, the tiles may be in contact with each other or separated by a gap. According to one embodiment, the tiles are separated from adjacent tiles by a gap of about 0.0625 inch. The tiles may be permitted to sit on the coverplate for a period of time to provide the bonding material with time to spread out and fill gaps between the tile and the coverplate and help prevent the formation of air bubbles between the tiles and the coverplate.

The period of time over which the tiles and the coverplate approach each other to arrive at a desired gap may be from about one to about four minutes for tile having dimensions of about 10 inches by about 12 inches and utilizing a bonding material having a viscocity of about 1000 centipoise.

Prior or subsequent to any settling time, the tiles and coverplate may be arranged under means for engaging and altering the position of the tiles. The coverplate may be secured to coverplate support prior or subsequent to placing tiles on the coverplate. The coverplate may be secured to the assembly fixture with means described above.

After arranging the coverplate and tiles under the tile engaging and position altering means, the assembly fixture may be engaged by an elevator 4 raising the coverplate and tiles toward the tile engaging and positioning means. The tiles may then be engaged by the tile engaging and positioning means.

The elevator may raise the coverplate and tiles a sufficient amount to cause the tiles to butt up against the tile engaging and positioning altering means, thereby applying at least some force to the coverplate and tiles. This force will cause bonding material between the tiles and the coverplate to spread out between the tiles and the coverplate, between the tiles themselves, as well as out from the periphery of the tiles. This additional force may also reduce the thickness of the bonding material between the tiles and the coverplate. However, since the tile engaging and positioning altering means preferably are compliant in the z axis direction, the amount of force that the elevator may apply may be limited to the weight of the tile engaging and position altering means.

The position of the tiles relative to each other and relative to the coverplate may now be detected. If necessary, the tiles may be moved so as to align them to the desired tolerance. According to one embodiment, the tiles are aligned so as to be about 0.002 inch apart. Additionally or alternatively, the alignment may be made such that the pixels of the tiles are aligned to within 0.0005 inch of the grid mask. According to one embodiment, the fiducial marks are a circle and a dot, as described above. These marks may be arranged so as to be coaxial within a tolerance of ± about 0.00005 inch.

Prior to or after alignment, the separation of the tiles and the coverplate may be checked and/or altered. For example, the tiles may be permitted to dwell on the coverplate for a certain period of time as described above. According to one embodiment, prior to the at least partial securing, the tiles are separated from the coverplate by a thickness of bonding material of about 3 mils.

After alignment, the tiles may be at least partially secured to the coverplate. As described above the at least partial securing of the tiles to the coverplate may be carried out by at least partially curing the bonding material between the tiles to coverplate.

After at least partially securing the tiles to the coverplate, the tiles and coverplate may be lowered by the assembly fixture elevator. Alternatively, the apparatus illustrated in FIGS. 1 and 2 may be moved to expose the upper surface of the tiles. Bonding material may then be applied to the surface of the tiles not secured to the coverplate and/or a backplate to be secured to the tiles.

A backplate may then be roughly arranged on the tiles. At some point prior to securing of the backplate to the tiles, the backplate may be permitted to sit on the tiles for a time sufficient to permit the backplate to settle on the tile and help the adhesive spread across a surface of the tiles and the backplate and to help prevent air bubbles from forming in the adhesive.

After arranging the backplate on the tiles, the backplate, tiles and coverplate may then be arranged under means for engaging and altering a position of the backplate. The coverplate, tiles and backplate may then be vertically moved to engage the backplate engaging and position altering means. As described above, the coverplate, tiles and backplate may be forced against the backplate engaging and position altering means to help force the backplate towards the tile so as to further help spread the adhesive and to help ensure an adhesive layer is formed of a desired thickness.

After engagement by the backplate aligner, the position of the backplate may then be detected and the backplate moved, if necessary, to ensure proper alignment of the backplate relative to the tiles and the coverplate. The position of the backplate may be determined by fiducial marks provided on the backplate and the-same or additional fiducial marks provided on the tiles and/or coverplate involved in aligning the tiles and coverplate. Alignment may then be rechecked and, if necessary, the backplate moved again. The alignment and verification of alignment procedures may be carried out as many times as is necessary to ensure alignment of the backplate.

Both the tiles and the backplate may be aligned by moving them in a first direction parallel to the upper surface of the coverplate, in other words, the x or y direction. The tiles and/or backplate may also be aligned by moving them in a second direction parallel to the upper surface of the coverplate and tiles and perpendicular to the first direction, in other words, in the other of the x and y directions. The coverplate and tiles may also be aligned by rotating in the x-y plane, parallel to the upper surface of the coverplate and/or tiles.

After alignment is ensured, the backplate may be at least partially secured to the tiles. As described above, the at least partial securing may take place by at least partially curing the bonding material between the backplate and the tiles.

After at least partial securing of the backplate to the tiles, the coverplate, tiles, and backplate may be fully secured to each other. The full securing may be carried out by fully curing the bonding material between the tiles and the coverplate and between the tiles and the backplate. The full curing may be carried out by directing UV radiation, heat, or whatever means are necessary to fully cure the bonding material toward the coverplate, tiles, and backplate.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method of determining the relative position of fiducial marks on a back plate, tiles, and cover plate relative to each other in an apparatus for forming a flat panel display by combining a plurality of individual display devices, the method comprising:

providing a cover plate with at least two fiducial marks;

providing at least two thin film transistor tiles each including at least one fiducial mark;

providing at least two chuck assemblies;

providing at least one camera arranged with each of the thin film transistor tiles;

mounting the at least one camera on each of the at least two chuck assemblies;

focusing the camera on the fiducial marks on the cover plate and the thin film transistor tiles;

providing a computerized control for controlling the movement of the at least two chuck assemblies and the thin film transistor tiles;

providing a computerized control for controlling focusing of the at least one camera on the chuck assembly;

calculating the correct amount of movement in x, y, and theta directions for each tile; and moving the thin film transistor tiles with the controller.

2. A method for aligning thin film transistor tiles relative to each other and to a cover plate, the method comprising:

providing the cover plate with a plurality of fiducial dots;

providing each thin film transistor tile with at least two ring shaped fiducial marks, the rings having an internal diameter slightly larger than the external diameter of the fiducial dots of the cover plate; and positioning the tiles relative to the cover plate by positioning the fiducial dots on the cover plate within the ring shaped fiducial marks on the thin film transistor tiles.

3. A method of aligning thin film transistor tiles in a flat panel display assembly using a plurality of tile positioners, the method comprising:

providing a cover plate having an upper surface;

providing tile chucks;

providing a first tile positioner comprising means for moving each tile chuck in a first direction parallel to an upper surface of the cover plate;

providing a second tile positioner comprising means for moving each tile chuck in a second direction parallel to the upper surface of the cover plate and perpendicular to the first direction; and providing a third tile positioner having means for rotating each tile chuck in a plane parallel to the upper surface of the cover plate.

4. A method of aligning thin film transistor tiles and a cover plate in a flat panel display assembly apparatus, the method comprising:

providing a camera;

providing at least one light source;

providing a cover plate with fiducial marks;

providing thin film transistor tiles each having fiducial marks;

placing the thin film transistor tiles on cover plate;

arranging the light source to illuminate the fiducial marks of the cover plate and the thin film transistor tiles;

positioning the cover plate between the light source and the camera;

focusing the camera on the fiducial marks on the cover plate and the thin film transistor tiles; and aligning the fiducial marks on the thin film transistor tiles with the fiducial marks on the thin film transistor tiles, the aligning being performed by a controller driving a chuck assembly.

* * * * *